United States Patent Office 3,290,323
Patented Dec. 6, 1966

3,290,323
ALLANTOIN GLYCYRRHETINIC ACID COMPLEXES
Irwin I. Lubowe, 667 Madison Ave., New York, N.Y.
No Drawing. Filed Apr. 16, 1965, Ser. No. 448,864
3 Claims. (Cl. 260—299)

This invention relates to new compositions of matter and, more particularly, to novel salts of allantoin including glycyrrhetinic acid and derivatives thereof and to processes for synthesizing said compositions. Said compositions may be used for the treatment of inflammatory, allergic and pruritic dermatoses, as epithelial stimulants, for the reduction of pruritus, and as a keratoplastic agent. These compositions may also be used to reduce the irritation and sensitization of cosmetic compounds such as hair dyes, bleaches, hair waving products, and hair sprays. They may also be employed as effective anti-inflammatory agents possibly in the same degree of effectiveness as the corticosteroids with the additional properties of being healing and keratolytic.

Allantoin is a nitrogen-containing compound having the following formula:

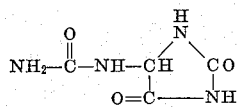

One of the compounds of the present invention comprises allantoin glycyrrhetinic acid having the structural formula:

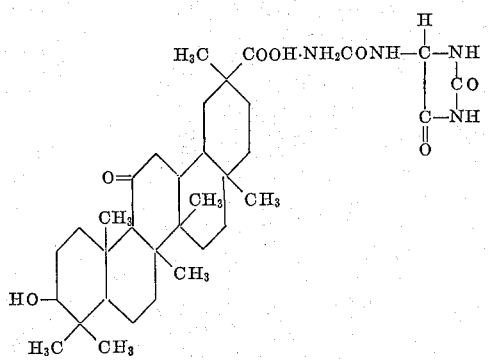

One mode of synthesizing allantoin glycyrrhetinic acid comprises thoroughly mixing 5 grams of glycyrrhetinic acid with 2 grams of allantoin. Five drops of boiling, distilled water is immediately added to this mixture whereupon trituration is continued until a semi-dry powdered mass forms. The mixture is then dried at about 160° F.

The resulting allantoin glycyrretinic acid compound comprises:

| | Percent |
|---|---|
| Glycyrrhetinic acid | 70±3 |
| Allantoin | 30±3 |

This compound is insoluble in water but is highly soluble in 50% alcohol. In a 1% suspension, the pH is 6.4.

Another method for producing allantoin glycryrrhetinic acid comprises interacting the sodium salt of glycrrhetinic acid with the sodium salt of allantoin and precipitating with HCl.

Another compound of the present invention comprises the aluminum chlorhydroxy derivative of allantoin glycyrrhetinic having the structural formula:

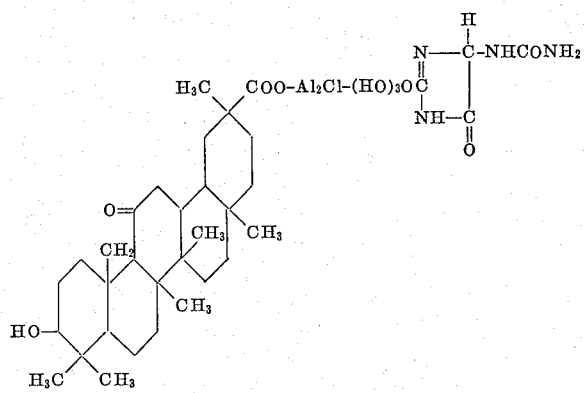

One method of making this compound comprises thoroughly mixing 5 grams of glycyrretinic acid with 5 grams of aluminum chlorhydroxy allantoinate. About five drops of boiling, distilled water is immediately added to this mixture which is triturated to a semi-powdered state, after which it is dried at about 160° F.

The approximate analysis of aluminum chlorhydroxy derivative of allantoin glycyrrhetinic acid is:

| | Percent |
|---|---|
| Glycyrrhetinic acid | 49±3 |
| Aluminum chlorhydroxy allantoinate | 51±3 |

A further compound of the present invention comprises the aluminum hydroxy derivative of allantoin glycyrrhetinic acid, having the structural formula:

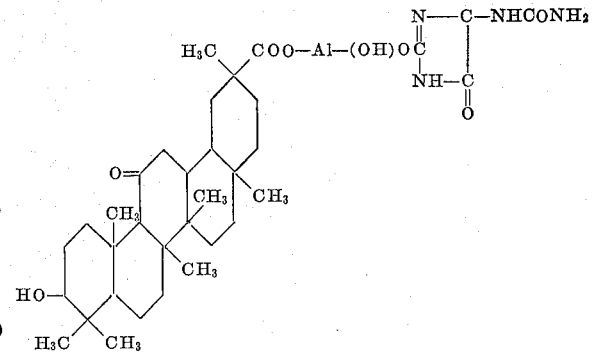

One method of making aluminum hydroxy derivatives of allantoin glycyrrhetinic acid comprises thoroughly mixing 5 grams of glycyrrhetinic acid with 4 grams of aluminum dihydroxy allantoinate. Five drops of boiling, distilled water is immediately added to the mixture which is triturated until a semi-powdered state is reached. Thereafter, the mixture is dried at about 160° F.

The approximate analysis of the aluminum derivative of allantoin glycyrrhetinic acid is:

| | Percent |
|---|---|
| Glycyrrhetinic acid | 46±3 |
| Aluminum dihydroxy allantoinate | 54±3 |

The foregoing detailed description has been given for clearness of understanding only and no unnecessary limitations are to be understood therefrom. The invention is not limited to the exact details shown and described, for obvious modifications will occur to those skilled in the art.

What is claimed is:
1. Allantoin glycyrrhetinic acid.
2. Aluminum chlorhydroxy derivative of allantoin glycyrrhetinic acid.
3. Aluminum hydroxy derivative of allantoin glycyrrhetinic acid.

References Cited by the Examiner
UNITED STATES PATENTS
3,107,252  10/1963  Lubowe _____ 260—299

OTHER REFERENCES
Lubowe and Mecca: Proc. S. S. Toilet Goods, Assoc., No. 42 (1964), pages 6 to 8.

ALEX MAZEL, Primary Examiner.
HENRY R. JILES, Examiner.
RICHARD J. GALLAGHER, Assistant Examiner.